United States Patent [19]
Aschoff et al.

[11] Patent Number: 5,934,152
[45] Date of Patent: Aug. 10, 1999

[54] ACCELERATOR PEDAL MODULE

[75] Inventors: Jorg Aschoff, Buhl; Harry Fleig, Appenweier; Emil Pfetzer, Buhl; Uwe Velte, Ottersweier; Erik Maennle, Oberkirch, all of Germany

[73] Assignee: Robert Bosch GmbH, Stuttgart, Germany

[21] Appl. No.: 08/849,199

[22] PCT Filed: Jul. 3, 1996

[86] PCT No.: PCT/DE96/01201

§ 371 Date: May 27, 1997

§ 102(e) Date: May 27, 1997

[87] PCT Pub. No.: WO97/12781

PCT Pub. Date: Apr. 10, 1997

[30] Foreign Application Priority Data

Sep. 30, 1995 [DE] Germany ............................ 195 36 606

[51] Int. Cl.⁶ ................................. G05G 1/14; F02D 7/00
[52] U.S. Cl. ................................. 74/513; 74/512; 74/560; 123/399; 701/1
[58] Field of Search ............................. 74/560, 561, 512, 74/513, 514; 338/153; 200/61.89; 267/154, 156, 272; 123/399; 701/1

[56] References Cited

U.S. PATENT DOCUMENTS

| 4,505,151 | 3/1985 | Sauerschell et al. |
| 4,869,220 | 9/1989 | Imoehl. |
| 4,883,037 | 11/1989 | Mabee et al. ............................ 123/399 |
| 4,944,269 | 7/1990 | Imoehl. |
| 5,051,550 | 9/1991 | Harris .................................... 74/560 X |
| 5,237,891 | 8/1993 | Neubauer et al. ........................ 74/560 |
| 5,416,295 | 5/1995 | White et al. ............................ 74/560 X |
| 5,535,642 | 7/1996 | Moll ........................................ 74/561 |
| 5,761,967 | 6/1998 | Papenhagen et al. .................... 74/513 |
| 5,768,946 | 6/1998 | Fromer et al. ............................ 74/514 |
| 5,787,760 | 8/1998 | Thorlakson .............................. 74/512 |

FOREIGN PATENT DOCUMENTS

| 092 640 | 2/1983 | European Pat. Off. |
| 3411393 | 2/1985 | Germany. |
| 4139496 A1 | 6/1992 | Germany ................................ 74/560 |
| WO 89/07706 | 2/1989 | WIPO. |
| WO 91/04165 | 2/1991 | WIPO. |

Primary Examiner—Vinh T. Luong
Attorney, Agent, or Firm—Edwin E. Greigg; Ronald E. Greigg

[57] ABSTRACT

An accelerator pedal modules for a motor vehicle which is actuated by the driver's foot. A sensor is disposed in a common housing together with other components, a restoring spring assembly, a kickdown mechanism and an end switch secured relative to the accelerator pedal and each other. The sensor is disposed in a separate housing, and by a suitable embodiment of the pedal lever, the accelerator pedal module can be adapted to a specific vehicle without modification of the sensor. This makes it possible to produce a standard sensor in large quantities. When the accelerator pedal module is activated the pedal activates the sensor which sends an electrical signal to a controller via electrical lines. The sensor includes a restoring spring which forces the pedal back to its normal rest position. The device includes a friction device which causes a friction in order to apply a force against momentum of the pedal. The controller controls an output of a driving engine. At least one spring forces the pedal back to its rest position.

21 Claims, 10 Drawing Sheets

ACCELERATOR PEDAL MODULE

BACKGROUND OF THE INVENTION

(1) Field of the Invention

The invention is based on an accelerator pedal module for controlling the output of a driving engine of a motor vehicle.

(2) Description of the Prior Art

To control the output of a driving engine of a motor vehicle, the demand made by the vehicle driver must be transmitted to the driving engine by a pedal lever disposed in the region of the vehicle driver. In conventional motor vehicles, this transmission is normally effected with the aid of mechanical transmission means. The mechanical transmission means are for instance a rod linkage or a Bowden cable. In these versions., there is a sensor that measures the position of the pedal lever. Measured values from this sensor are transmitted to the driving engine for the sake of controlling the engine.

Until now, the sensor has been supported in a common housing together with the restoring spring assembly (such as DE 34 11 393 A1; EP-A 00 92 640; WO-A 89/07706; WO-A 91/04165). In addition, the common housing often also includes a kickdown mechanism and an end switch, as well as various friction elements and springs that act on the friction elements. In these versions, the wiper of the sensor, the restoring springs, the springs for the friction elements, and parts of the kickdown mechanism are supported on a common shaft. Since along with the sensor various other components are also disposed in the housing, adapting to vehicle-specific differences entails major effort and expense. Since there are many different vehicle-specific demands, there are many different variant embodiments. In the known version, simple adaptation to different vehicle-specific pedal travel distances is not possible unless the entire structural unit that contains the sensor is modified. Moreover, because the housing is rather large, the sensor can normally not be disposed within a range of the driver's foot.

SUMMARY AND ADVANTAGES OF THE INVENTION

A sensor is a complex component that can be manufactured economically only if it is possible to produce the sensor in a uniform design in large numbers. Any modification increases the production cost considerably. The proposed accelerator pedal module can advantageously be manufactured in such a way that a uniformly designed sensor can always be secured to the mounting structure. Adaptation to special customer demands, which can fluctuate considerably from vehicle to vehicle, can advantageously be met without major expense by simply modifying the pedal lever or the mounting structure or the bearing radius.

By suitably choosing the engagement between the sensor lever pivot connection and the pedal lever pivot connection, and in particular by a suitable choice of the radial spacing between the pivot axis and the pedal lever pivot connection, the resolution of the sensor can advantageously be adapted easily, simply and without major effort to customer demands, without requiring a modification of the sensor. This reduces the great number of parts considerably.

The accelerator pedal module advantageously allows a structural form that can be manufactured economically in a way easy to assemble and that can be adapted easily without additional expense.

Even when there is a single accelerator pedal module, the savings attainable in terms of production cost and structural volume make themselves felt in an advantageous way. Given the fact that the accelerator pedal module is required in large numbers and is manufactured on a large mass-produced scale, very major, decisive cost advantages result. In the proposed accelerator pedal module, assembly is facilitated greatly, which is especially clear given the large numbers involved. Automated or semiautomated manufacture is made substantially easier.

Since the accelerator pedal module can be produced as a compact structural unit, the space required for the accelerator pedal module in a motor vehicle is advantageously especially slight, and mounting of the accelerator pedal module in the motor vehicle is especially simple.

In the accelerator pedal module proposed here, the sensor can be disposed in a separate housing, and by suitably designing the pedal lever, the accelerator pedal module can advantageously be adapted to a specific vehicle without modifying the sensor. This makes it possible to produce a standard sensor in large numbers.

By means of the provisions recited herein, advantageous further features of and improvements to the accelerator pedal module are possible.

The sensor housing, which is pivotable about the sensor lever pivot axis, offers the advantage that the sensor can be calibrated very simply and quickly. For example, the sensor can be calibrated such that when the pedal lever is not actuated, the electrical signal that is output by the sensor has a very specific, defined value.

As a result of the stop on the pedal lever, on which the sensor lever pivot connection comes to rest, or the stop on the sensor lever, on which the pedal pivot connection comes to rest, an easily manufactured, functionally safe connection between the pedal lever and the sensor is achieved.

The restoring safety means that acts between the pedal lever and the sensor lever offers the advantage that a restoration of the sensor is assured without any sensor restoring spring or in the event of a failure of a sensor restoring spring.

The sensor restoring spring that restores the sensor lever of the sensor makes a play-free pivot connection between the sensor lever and the pedal lever possible.

If the sensor is a premountable structural unit, then this advantageously results in a simple, economical manufacture of the sensor and advantageous, easy keeping of the sensor in inventory. Because of the premountable structural unit, the sensor can advantageously be manufactured in large quantities, regardless of any differences in the pedal lever that have to be taken into account for vehicle-specific reasons.

By supporting the pedal lever via a bearing housing with a bearing radius and a bearing journal supported in the bearing housing, with the bearing journal dimensioned as large enough to engender a strongly perceptible frictional hysteresis that hinders a pivoting motion of the pedal lever, the advantage is attained that friction, which markedly improves the driving feel, is created, even though the number of components required is very small.

The bearing radius that determines the friction can be adapted in a simple, advantageous way to the demands of a customer or to vehicle-specific requirements. In particular, there is no need to change the sensor that furnishes a signal to a controller.

If the restoring spring assembly is embodied such that it acts upon the pedal lever in a manner that determines the friction, then this has the advantage that if a reduction in the restoring force of the restoring spring assembly should occur as a result of a defect, the friction decreases to the same extent as the restoring force, so that even when there is reduced restoring force, it remains assured that the pedal lever will be returned to its proper position.

If the restoring spring assembly includes a plurality of restoring springs, preferably two of them, this has the advantage that if one of the restoring springs fail the restoration of the pedal lever remains assured.

If the restoring spring assembly is embodied in the form of a leaf spring or a plurality of leaf springs, this advantageously results in an especially simple, space-saving, easily manufactured, economical embodiment.

If the leaf spring is bent in a U, then the leaf spring can advantageously be built in an especially space-saving way without the structural volume of the overall device being increased by the leaf spring. The U-shape especially cleverly corresponds approximately to the angular position that the pedal lever has relative to the mounting structure.

By integrating at least one portion of the leaf spring with the mounting structure or at least one portion of the leaf spring with the pedal lever, or by integrating part of the leaf spring with the pedal lever and another part with the mounting structure, the overall space required is reduced to a minimum. By embodying the mounting structure or the pedal lever partly as hollow, the strength of these parts is hardly reduced yet considerable material and weight can be saved, and a space is produced that is excellently suitable for the disposition of the leaf spring.

If the restoring spring of the restoring spring assembly is embodied in such a way that if the restoring spring should possibly break at least a portion of the restoring spring will fall visibly out of its functional position, this offers the advantage that the defect can easily be detected in a simple inspection of the vehicle or the accelerator pedal module.

The provision of the kickdown mechanism or of a switch or fixed stop on the mounting structure or the pedal lever, preferably in the form of a completely preassembled and preferably easily mounted structural unit, offers the advantage that to meet customer demands, the requisite kickdown mechanism or the requisite switch or fixed stop can be mounted entirely without other changes to the accelerator pedal module, or with only insignificant changes.

The snap mechanism advantageously facilitates the mounting of the kickdown mechanism or switch or fixed stop considerably. The snap mechanism also makes it markedly easier to adapt the accelerator pedal module quickly to special customer demands.

BRIEF DESCRIPTION OF THE DRAWINGS

Selected, especially advantageous exemplary embodiments of the invention are shown in simplified form in the drawing and described in further detail in the ensuing description.

DESCRIPTION OF THE EXEMPLARY EMBODIMENTS

The accelerator pedal module embodied according to the invention can be used to control various driving engines. By way of the example, the driving engine is an Otto engine, whose throttle valve is adjusted with a control motor. In that case, the accelerator pedal module serves to generate electrical signals that are delivered to the control motor that adjusts the throttle valve. However, the driving engine may also by way of example be a Diesel engine or an electric motor; in these cases as well, electrical signals originate at the accelerator pedal module and, suitably transformed, control the output of the driving engine.

The accelerator pedal module is preferably disposed directly within the action range of the driver of a motor vehicle. The pedal lever of the accelerator pedal module is preferably the accelerator pedal actuated directly by the driver's foot. If a special need exists, however, it is also possible without difficulty, by simple mechanical means, to pivotably connect a separate accelerator pedal or some other control lever to the pedal lever of the accelerator pedal module.

Figure 1:
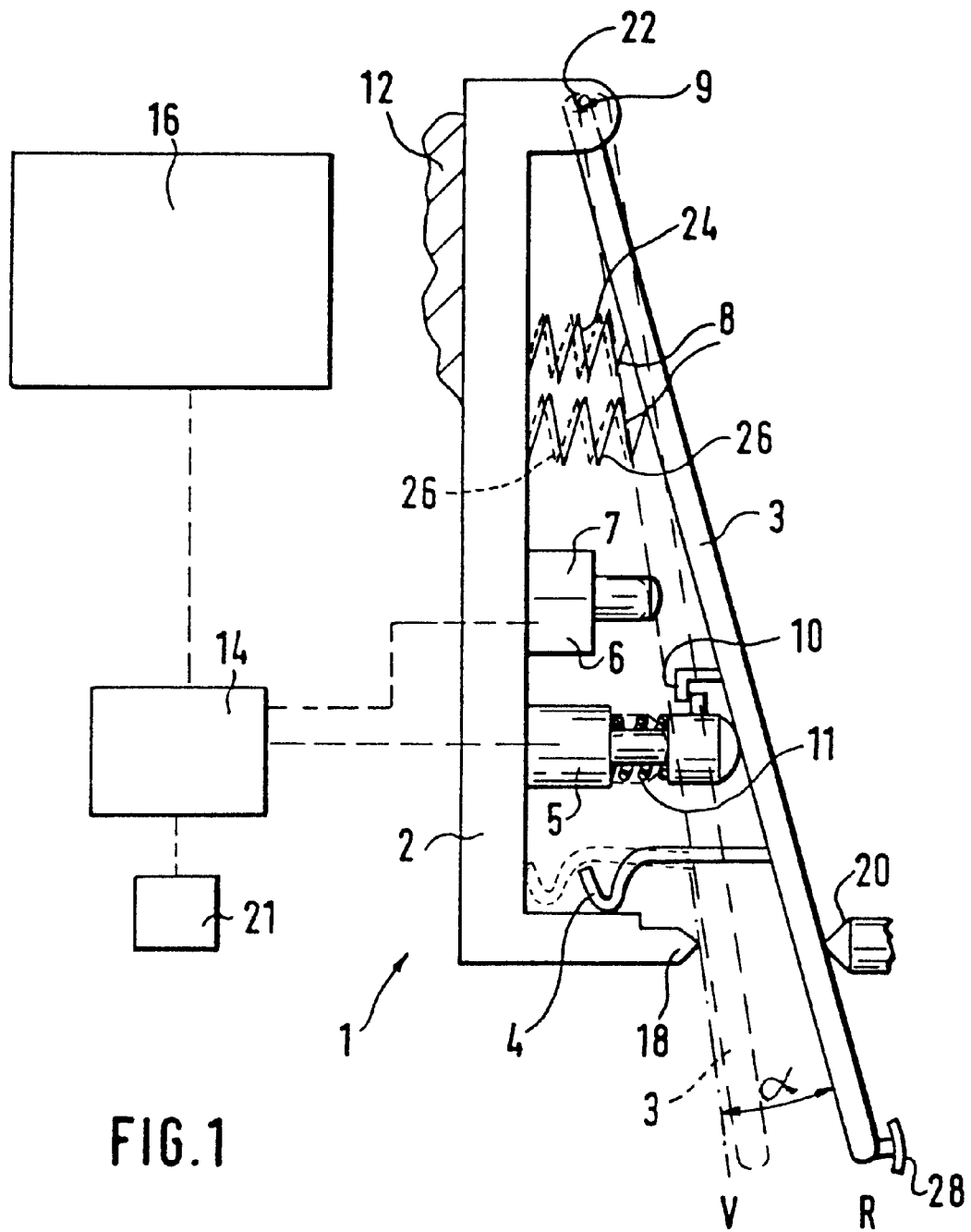
FIG. 1 schematically illustrates a side view of an accelerator pedal module interconnected with a controller, an engine and a transducer.

FIG. 1 schematically shows an accelerator pedal module 1. The accelerator pedal module 1 includes a mounting structure 2, a pedal lever 3, a friction device 4, a sensor 5, a switch 6, a kickdown mechanism 7, a restoring spring assembly 8, and a bearing point 9.

The mounting structure is preferably secured directly in foot range of a vehicle driver to a chassis 12 shown symbolically by shading in FIG. 1. The pedal lever 3 is preferably actuated directly by the driver's foot. However, it is also possible for a separate accelerator pedal to be pivotably connected to the pedal lever 3 via a simple connecting rod.

The pedal lever 3 is pivotably supported at the bearing point 9 relative to the mounting structure 2. The sensor 5 senses the position of the pedal lever 3 and furnishes a signal, corresponding to the position of the pedal lever 3, to a controller 14 via electrical lines shown in dashed lines in FIG. 1.

At a certain position of the pedal lever 3, the switch 6 furnishes a signal to the controller 14 via an electrical line shown in dashed lines. The switch 6 may for instance be provided in order to ascertain whether the pedal lever 3 is unactuated and/or whether the pedal lever 3 is maximally actuated. Depending on the particular application, it is also possible to dispense with the switch 6.

The kickdown mechanism 7 assures that at a certain position of the pedal lever 3, the force with which the pedal lever 3 must be actuated increases abruptly. Depending on the particular application and in particular on the type of driving engine 16, either the kickdown mechanism 7 is present or the kickdown mechanism 7 is dispensed with.

The switch 6 and the kickdown mechanism 7, in the particularly advantageous exemplary embodiments selected for the description, are attached by a simple snap mechanism in such a way that these parts can also be omitted as needed without making other changes. It is easily possible instead of the switch 6 or kickdown mechanism 7 to provide a fixed stop, for instance, which is likewise secured via a snap mechanism. This makes it much easier to adapt the accelerator pedal module 1 to vehicle-specific requirements. By way of example, the fixed stop may serve to limit a full-load position V.

In the sensor 5, a sensor restoring spring 11 is provided. The sensor restoring spring 11 assures that the movable part of the sensor 5 can follow up any motion of the pedal lever 3 without play. To improve safety considerably, it is proposed that a restoring safety means 10 be provided in addition. The restoring safety means 10 assures that if the sensor restoring spring 11 fails, the movable part of the sensor 5 will be slaved by the pedal lever 3. As a result of the restoring safety means 10, the movable part of the sensor 5, even if the sensor restoring spring 11 fails, assumes a safety position in which the output of the driving engine 16 is for instance so low that at least the motor vehicle is not accelerated. The restoring safety means 10 engages the movable part of the sensor 5 with some play. The play between the movable part of the sensor 5 and the pedal lever 3 that results if the sensor restoring spring 11 fails is at most a slight esthetic imperfection and is easily acceptable.

Depending on the signals furnished by the sensor 5 and the switch 6 and optionally others furnished to the controller 14, the controller 14 controls the output of the driving engine 16 shown symbolically in FIG. 1. By way of example, the driving engine 16 is an Otto engine, Diesel engine, hybrid motor, electric motor or the like.

A full-load stop 18 and a repose stop 20 are provided on the mounting structure 2. If the pedal lever 3 is not actuated by the vehicle driver, then the pedal lever 3, driven by the restoring spring assembly 8, is located on the repose stop 20. This position will hereinafter be called the repose position R. The vehicle driver can actuate the pedal lever 3 until the pedal lever 3 comes to rest on the full-load stop 18. That position of the pedal lever 3 on the full-load stop 18 will hereinafter be called the full-load position V. The full-load position V of the pedal lever 3 is symbolically represented in FIG. 1 by a dot-dashed line.

If the pedal lever 3 is in the position of repose R, for instance, then the driving engine 16 is operating at minimum output unless the driving engine 16 is operating at higher output on the basis of signals from a transducer 21. The transducer 21 is a temperature sensor, an automatic speed transducer, or the like, for instance. Depending on the type of vehicle, it is also possible for the driving engine 16 to be off when the pedal lever 3 is in the position of repose R.

In the region of the bearing point 9 there is a pivot axis 22. The pivot axis 22 extends vertically to the plane of the drawing in FIG. 1 and is the center of pivoting about which the pedal lever 3 can be pivoted. The pivot axis 22 is symbolically indicated in the drawing (FIG. 1) by two short strokes perpendicular to one another (+). The pedal lever 3 is adjustable via an actuation angle alpha ($\alpha$). The actuation angle alpha ($\alpha$) is 15°, for instance.

By pivoting the pedal lever 3 about the pivot axis 22 via the actuation angle alpha ($\alpha$), the driver can actuate the pedal lever 3 from the position of repose R to the full-load position V. When the pedal lever 3 is not actuated, the restoring spring assembly 8 assures that the pedal lever 3 reaches it position of repose R.

The restoring spring assembly 8 includes a plurality of restoring springs 24, 26. The restoring spring assembly 8 is embodied such that if one of the restoring springs 24, 26 fails, the restoring force F3 (FIG. 10) of the remaining restoring spring or restoring springs suffices so that the pedal lever 3 will reliably be returned to its position of repose R. It has been found that in view of the engineering expense and the attainable safety, the use of two restoring springs 24, 26 for the restoring spring assembly 8 is optimal. Dividing up the restoring spring assembly 8 into three restoring springs or even more restoring springs is also possible but is unlikely to be necessary even if stringent safety demands are made.

In FIG. 1, the friction device 4 is shown symbolically, for the sake of greater simplicity, as a separate element acting between the pedal lever 3 and the mounting structure 2. As will be described hereinafter at length, in the accelerator pedal module 1 proposed the friction device 4 is integrated directly into the bearing point 9, which offers major advantages with respect to the function, adaptability of the accelerator pedal module 1 to various conditions of various vehicles, the number of requisite components, and other engineering expense and structural size, among other factors. This will also be described in detail in conjunction with the drawing figures described below.

Figure 10:
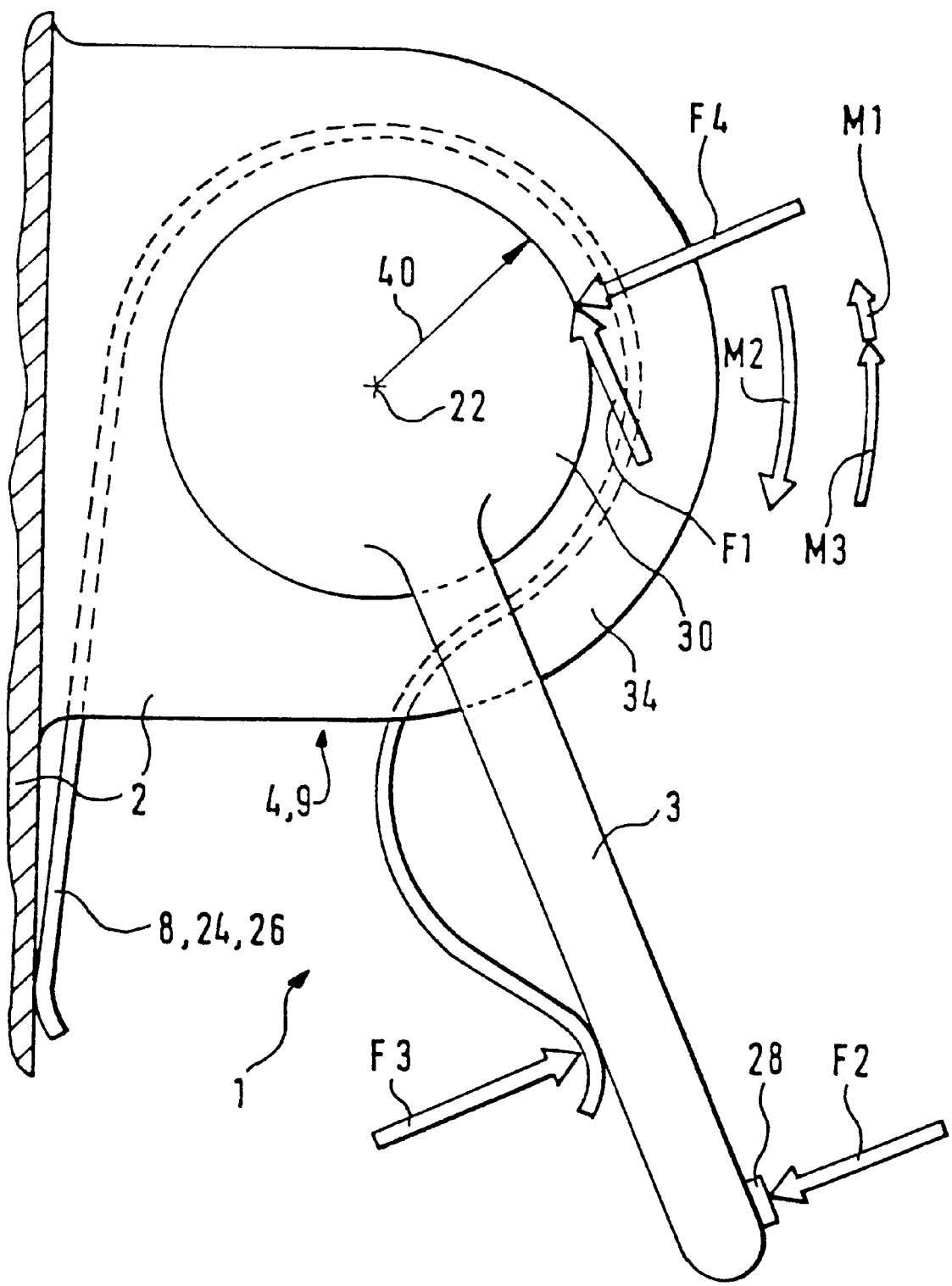
FIG. 10 schematically illustrates a modification of the restoring springs shown in FIGS. 1 and 2.

FIG. 10 shows the accelerator pedal module 1 in a highly schematic form.

In all the drawing figures, elements that are identical or function identically are provided with the same reference numerals.

Unless otherwise stated or otherwise shown in the drawing, what is described and shown in conjunction with one of the drawing figures applies to the other exemplary embodiments as well. Unless otherwise stated in the description, the details of the various exemplary embodiments can be combined with one another.

FIG. 10 shows at a glance the forces and torques acting on the pedal lever 3. The forces acting on the pedal lever 3 are identified by the letter F. The torques acting on the pedal lever 3 are identified by an M. FIG. 10 shows the forces F1–F4 and the torques M1–M3 acting on the pedal lever 3 during a uniform adjustment of the pedal lever 3 clockwise about the pivot axis 22, or in other words during an adjustment of the pedal lever 3 in the direction of the full-load position V (FIG. 1).

The friction device 4 assures a frictional hysteresis that hinders the pivoting motion of the pedal lever 3. Both upon actuation of the pedal lever 3 from the position of repose R to the full-load position V and upon actuation of the pedal lever 3 from the full-load position V to the position of repose R, the friction device 4 assures a frictional force between the pedal lever 3 and the mounting structure 2. The frictional force acting on the pedal lever 3 during an adjustment of the pedal lever 3 to the full-load position V will hereinafter be called the frictional force F1 and is represented in FIG. 10 by an arrow carrying the reference symbol F1. The frictional force F1 acts upon a bearing journal 30 formed onto the pedal lever 3 in a manner fixed against relative rotation. The bearing journal 30 has a radius chosen to be large, hereinafter called the bearing radius 40. The bearing journal 30 is rotatably supported in a bearing shell 34 that is either formed or mounted onto the mounting structure 2 in a manner fixed against relative rotation. The frictional force F1 acting on the pedal lever 3 between the pedal lever 3 and the mounting structure 2 causes a torque in the opposite direction from the pivoting motion of the pedal lever 3. This torque will hereinafter be called the frictional moment M1. The frictional moment M1 in the opposite direction of the pivoting motion produces a frictional hysteresis that hinders the pivoting motion of the pedal lever 3.

On the end remote from the pivot axis 22, the pedal lever carries a pedal plane 28. For adjusting the pedal lever 3, the vehicle driver presses on the pedal plate 28 with a pedal force F2. The pedal force F2 exerts an actuation moment M2 on the pedal lever 3 clockwise about the pivot axis 22. The restoring force F3 of the restoring spring assembly 8 produces a restoring moment M3 on the pedal lever 3 counterclockwise about the pivot axis 22. Upon motion of the pedal lever 3 into the full-load position V, the frictional moment M1 acts counterclockwise, while upon motion of the pedal lever 3 in the direction of the position of repose R, the frictional moment M1 acts clockwise upon the pedal lever 3. For adjusting the pedal lever 3 in the direction of the full x V, the actuation moment M2 must be at least as great as the restoring moment M3 of the restoring spring assembly 3, plus the frictional moment M1. The adjustment of the pedal lever 3 in the opposite direction does not take place until whenever the actuation moment M2 is less than the restoring moment M3 of the restoring spring assembly 8, minus the frictional moment M1. As a result of the frictional moment M1, a hysteresis is created, which assures that the pedal lever 3 will not unintentionally execute any motion already at slight changes in the pedal force F2 or actuation moment M2 acting on the pedal plate 28.

Figure 2:
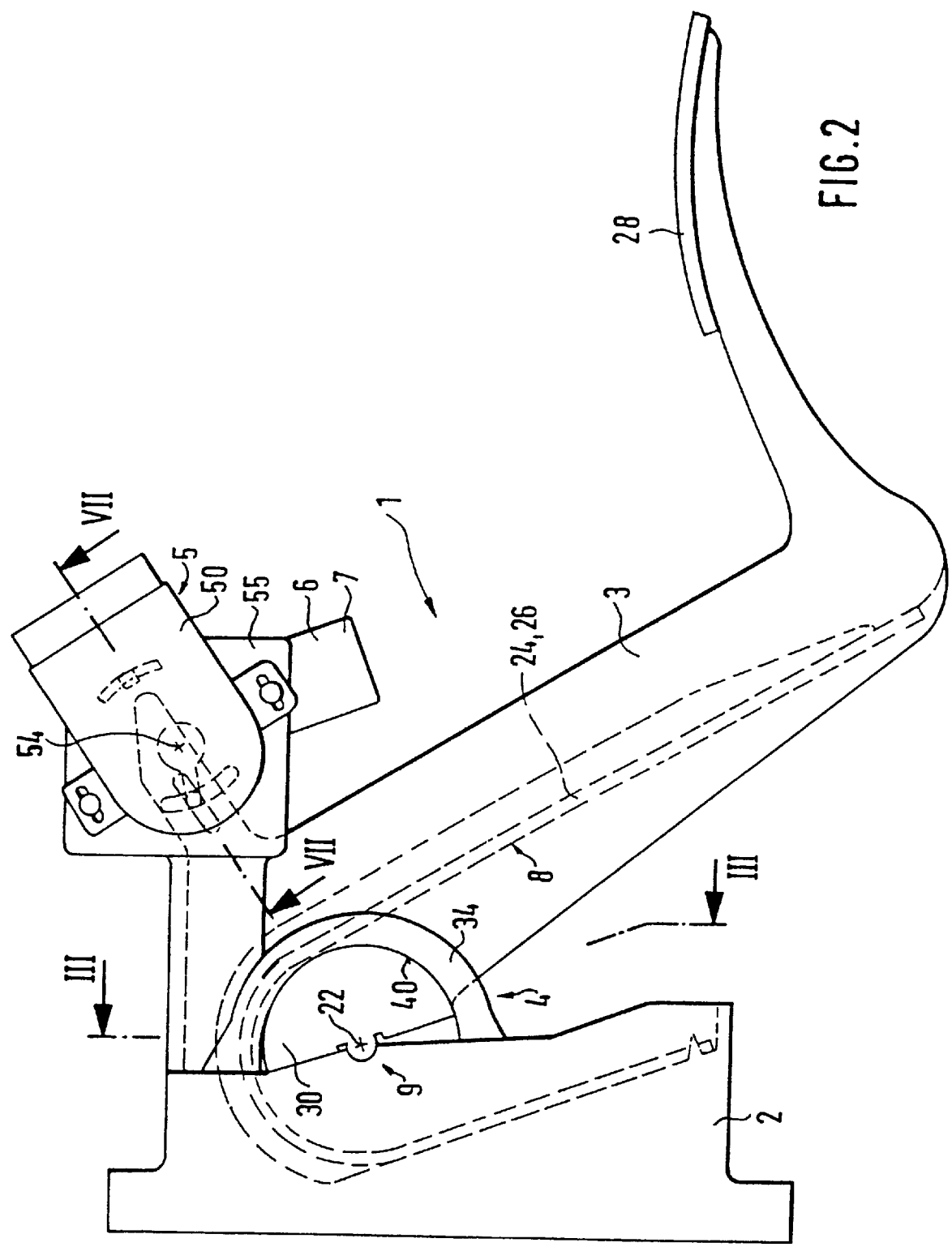
FIG. 2 illustrates a side-view of a modification of the accelerator pedal module shown in FIG. 1.

FIG. 2 shows a side view of a selected, especially advantageous exemplary embodiment.

Figure 3:
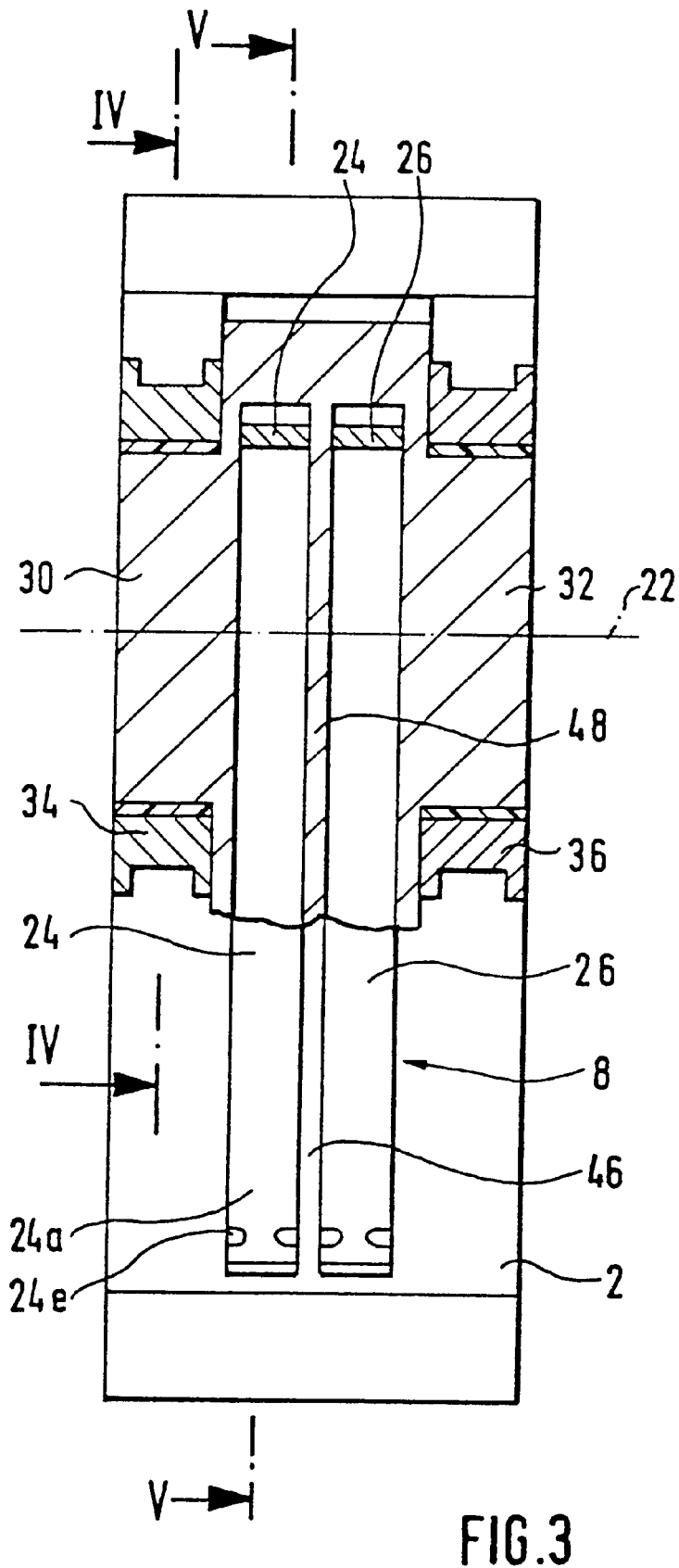
FIG. 3 is a cross-sectional view of FIG. 2 taken along lines III—III.
Figure 4:
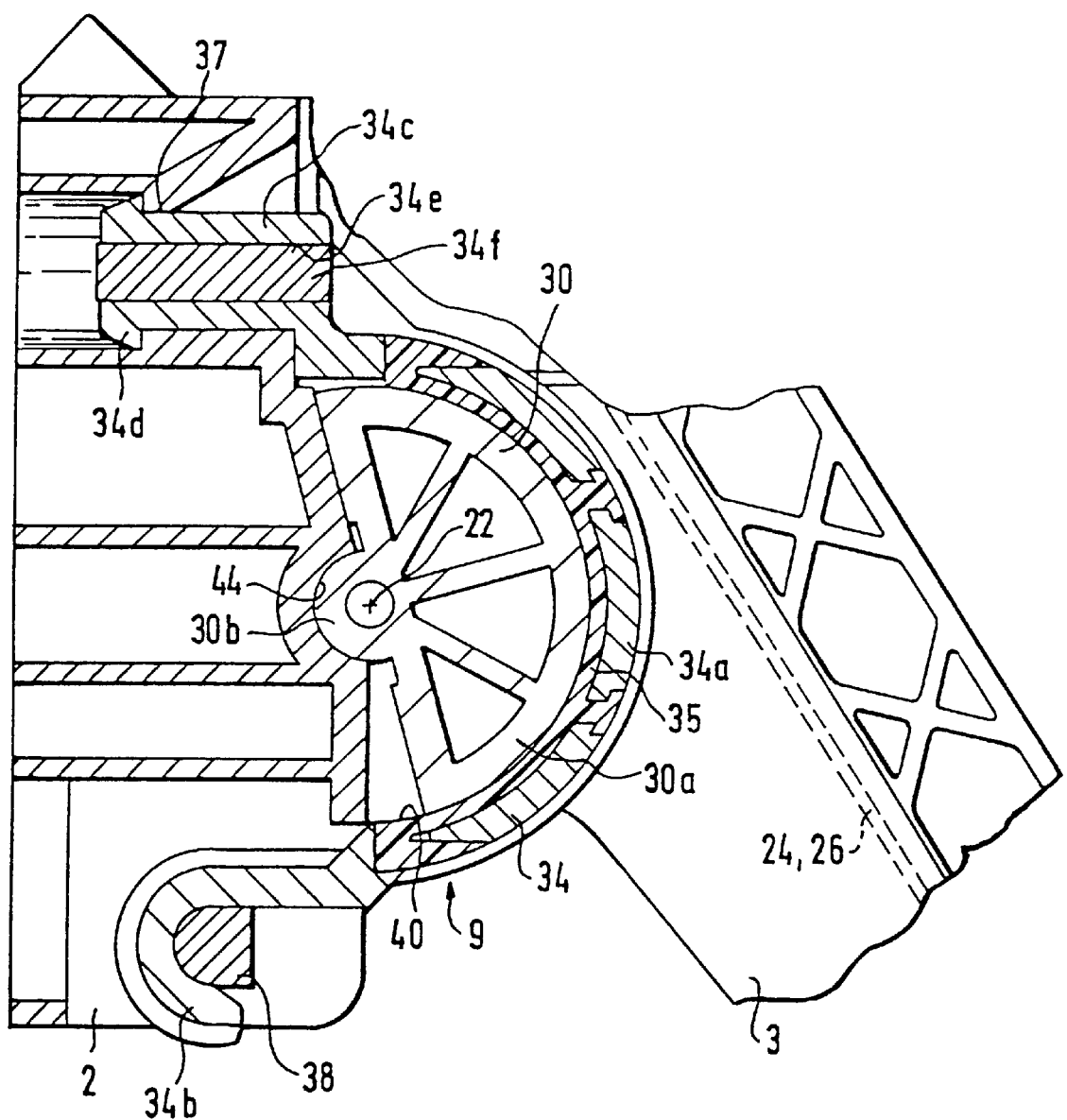
FIG. 4 is a cross-sectional view of FIG. 3 taken along lines IV—IV.
Figure 5:
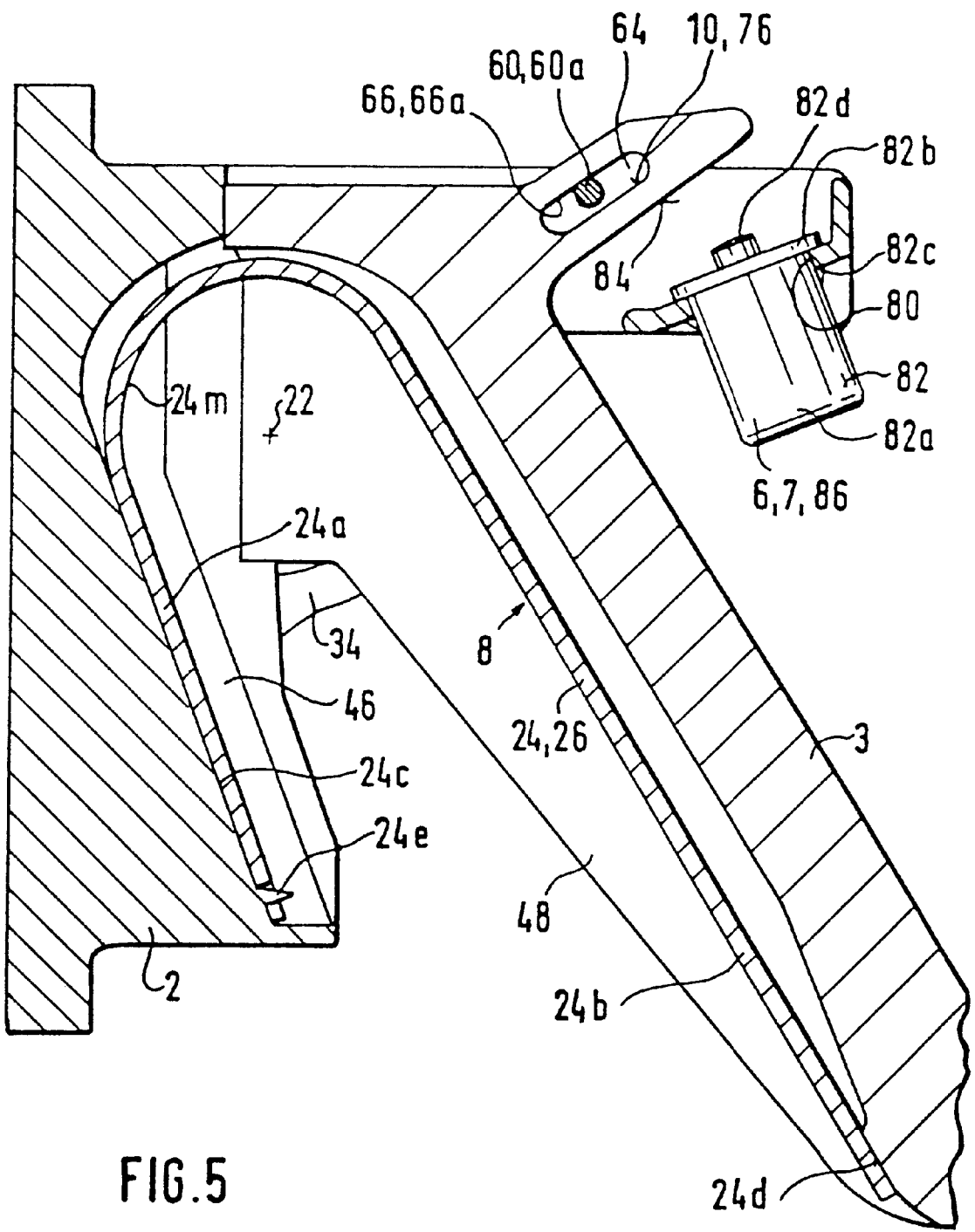
FIG. 5 is a cross-sectional view of FIG. 3 taken along lines V—V.

In FIG. 2, one can seen an advantageously embodied accelerator pedal module 1, selected by way of example, in a side view, with the mounting structure 2, the pedal lever 3, the friction device 4, the sensor 5, the switch 6, the kickdown mechanism 7, the restoring spring assembly 8, and the bearing point 9. The pedal plate 28 is formed onto the pedal lever 3. To increase the output of the driving engine 16 (FIG. 1), the vehicle driver presses on the pedal plate 28 with his foot. FIG. 3 shows a section through the accelerator pedal module 1 along the sectional plane III—III shown as dot-dashed lines in FIG. 2. FIG. 4 shows a detail of the sectional plane IV—IV indicated in FIG. 3. For the sake of easier reproduction of the drawing, in FIG. 4 the region around the bearing point 9 having the bearing journal 30 and the bearing shell 34 is shown on a different scale. In FIG. 4, one sees only a detail of the mounting structure 2 and the pedal lever 3. In FIG. 5, a sectional plane marked V—V is shown in FIG. 3.

The bearing journal 30 and, as FIG. 3 shows, one further bearing journal 32 are formed onto the pedal lever 3. The bearing shell 34 and one further bearing shell 36 are secured to the mounting structure 2. Viewed longitudinally of the pedal lever 3, one of the two bearing shells 34, 36 and one of the bearing journals 30, 32 is each located on either side of the pedal lever 3. This produces an especially reliable, stable, two-sided support of the pedal lever 3.

A crossbar 38 and an opening 37 embodied in stepped fashion are formed onto the mounting structure 2 (FIG. 4).

The bearing shell 34 can be imagined as being divided into a middle region 34*a*, a first end region 34*b* and a second end region 34*c* (FIG. 4). The middle region 34*a* is curved and has the bearing radius identified by reference numeral 40 on the inside of the arc. The first end region 34*b* is hook like in shape and is suspended from the crossbar 38. The second end regions 34*c* of the bearing shell 34 has a stepped cylindrical form. An encompassing protrusion 34*d* is provided on the outer circumference of the second end region 34*c*. This protrusion 34*d* is embodied such that when the bearing shell 34 is attached to the mounting structure 2, the second end region 34*c* can be pressed with moderate force into the opening 37, yet because of the encompassing protrusion 34*d* the second end region 34*c* is prevented from slipping out of the opening 37. A bolt 34*f* serves to increase the security against slipping out. To that end, the cylindrical second end region 34*c* has a bore 34*e*. After the second end region 34*c* has been mounted in the opening 37 of the mounting structure 2, the tightly seated bolt 34*f* is press-fitted into the bore 34*e*. The bolt 34*f* considerably increases the retaining action of the protrusion 34*d*. The bolt 34*f* is press-fitted far enough into the bore 34*e* that the bolt 34*f* is flush with the bearing shell 34 on the surface thereof visible from outside.

In or on the mounting structure 2, a pedal lever guide 44 (FIG. 4) is provided. The pedal lever guide 44 has a radius that is substantially smaller than the bearing radius 40.

Seen in cross section (FIG. 4), the bearing journal 30 can be divided into a friction portion 30*a* and a guide portion 30*b*.

The outer radius of the friction portion 30*a* is adapted to the bearing radius 40, specifically in such a way that the friction portion 30*a* fits into the shell-like middle region 34*a* of the bearing shell 34 without seizing. It will be assumed hereinafter for the sake of simplicity that the radius on the outer circumference of the friction section 30*a* is approximately identical to the bearing radius 40.

The outer radius of the guide portion 40*b* of the bearing journal 30 is adapted to the inside radius of the pedal lever guide 44, specifically in such a way that guidance of the pedal lever 3 on the mounting structure 2 comes about at this point. In the mounted state, the bearing shell 34 holds the guide portion 30*b* of the bearing journal 30 in the pedal lever guide 44 provided on the mounting structure 2.

The radius of contact between the pedal lever guide 44 and the guide portion 30*b* of the bearing journal 30 is chosen to be relatively short, so that no significant frictional action occurs here between the pedal lever 3 and the mounting structure 2. Since the friction at this point depends on various circumstances, such as production tolerances, the wear state, the appearance of forces possibly exerted obliquely on the pedal lever 3, etc., it is expedient to embody this point in such a way that the frictional force or frictional moment occurring here is negligible.

Figure 6:
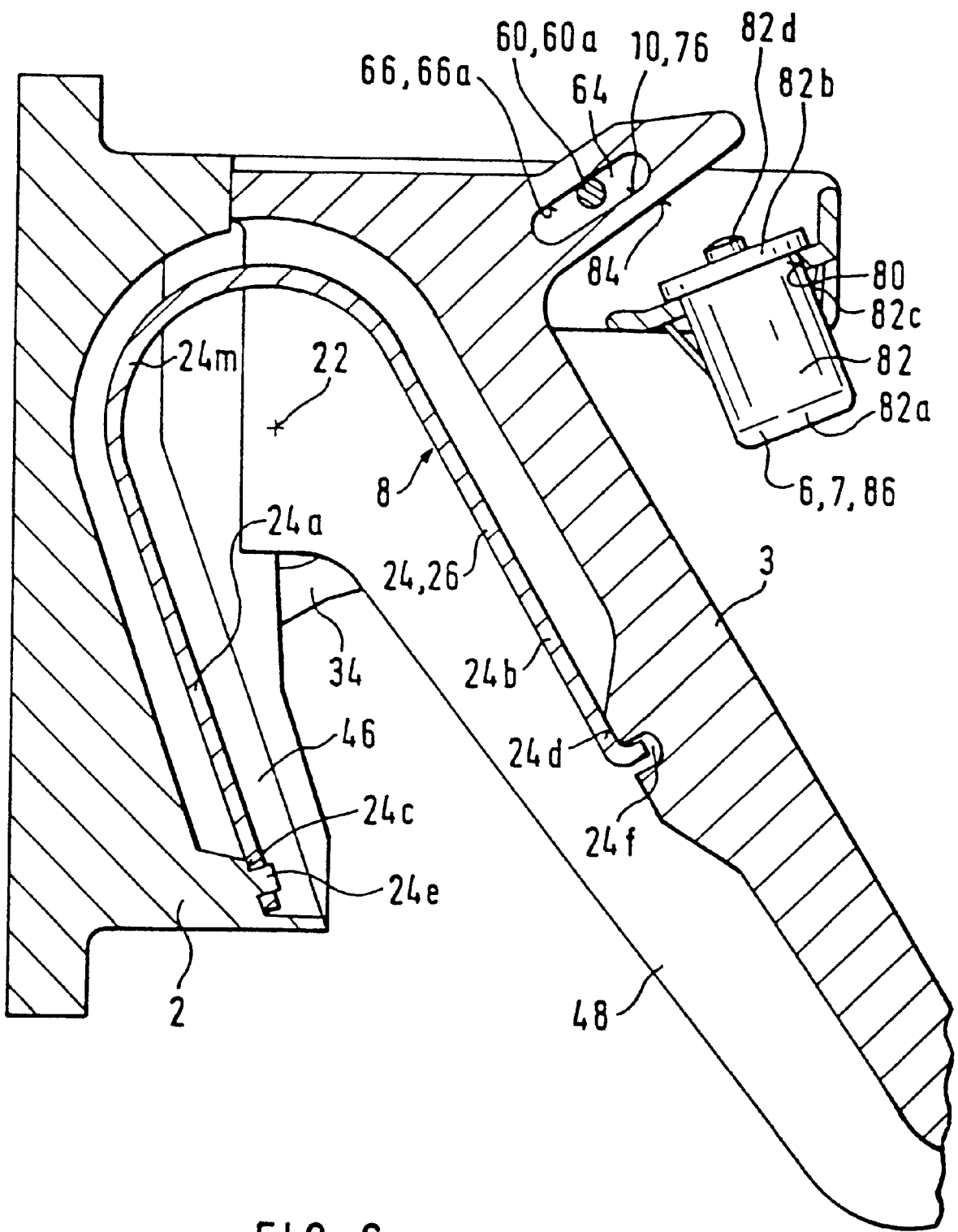
FIG. 6 is a modification of the device shown in FIG. 5.

As can be seen from the drawing (particularly FIG. 3), in the particularly advantageous exemplary embodiment shown the restoring spring assembly 8 includes two restoring springs 24, 26, and both restoring springs 24, 26 are embodied especially cleverly in the form of two leaf springs 24 and 26 (see particular FIGS. 5, 6).

As FIG. 5 shows, the leaf spring 24 is U-shaped and has one spring leg 24*a* and another spring leg 24*b*. A region of the leaf spring 24 that is curved in a circular arc and joins the two spring legs 24*a*, 24*b* will hereinafter be called the middle spring region 24*m*. The spring leg 24*a* acts upon the mounting structure 2. The other spring leg 24*b* acts upon the pedal lever 3, urging the pedal lever 3 to return to the position of repose R (FIG. 1). Both leaf springs 24, 25 are shaped identically and function identically.

The approximately U-shaped form of the leaf spring 24 may be such that the spring legs 24*a*, 24*b* extend parallel to one another or either converge or diverge relative to one another beginning at the middle spring region 24*m*. This depends essentially on the angular position that the pedal lever 3 assumes relative to the mounting structure 2.

The leaf springs 24, 26 generate a transverse force that acts as a restoring force F3 on the pedal lever 3 (FIG. 10).

The restoring force F3 acts upon the pedal lever 3 with radial spacing from the pivot axis 22. The result of the restoring force F3 and the radial spacing is the restoring moment M3 acting upon the pedal lever 3 as already mentioned above. The restoring moment M3 acts counterclockwise on the pedal lever 3 (FIG. 4, 5, 10).

The result of the restoring force F3 generated by the leaf springs 24, 26 and exerted on the pedal lever 3 is a reaction force F4, with which the mounting structure 2 acts upon the pedal lever 3 in the region of the bearing point 9. This reaction force F4 is quantitatively equal to the restoring force F3 with which the leaf springs 24, 26 act upon the pedal lever 3. The reaction force F4 is intercepted in the region of the bearing point 9 between the friction portion 30a of the bearing journal 30 and the middle region 34a of the bearing shell 34 (FIG. 3). Since the leaf springs 24, 26 can be embodied as relatively soft, and thus upon actuation of the pedal lever 3 the restoring force F3 hardly varies over the entire actuation angle alpha ($\alpha$), the reaction force F4 between the friction portion 30a of the bearing journal 30 and the middle region 34a of the bearing shell 34 varies equally slightly. The reaction force F4 between the aforementioned parts in the region of the bearing point 9 is in particular independent of production tolerances in the region of the bearing point 9 and is also independent of any wear that might occur. Moreover, the reaction force F4 is independent of forces acting upon the pedal plate 28. Since the restoring force F3, with which the leaf springs 24, 26 act upon the pedal lever 3, can be structurally dimensioned relatively simply and accurately, it is simple for the reaction force F4 between the bearing journal 30 and the bearing shell 34 to be structurally determined in advance.

With the choice of material for the friction portion 30a of the bearing journal 30 and the middle region 34a of the bearing shell 30, a structurally accurately predeterminable friction parameter mu ($\mu$) between the bearing journal 30 and the bearing shell 34.

As a function of the aforementioned reaction force F4 between the bearing journal 30 and the bearing shell 34, and as a function of the friction parameter my ($\mu$) the friction force F1 acting upon the bearing journal 30 at the circumference of the friction portion 30a is obtained when the pedal lever 3 is actuated. In addition, depending on the outer radius of the friction portions 30a, which is identical to the bearing radius 40, the friction force F1 acting on the outer circumference of the friction portion 30a results in the frictional moment M1 oriented counter to the swiveling of the pedal lever 3. This frictional moment M1 assures that any slight jittering of the driver's foot, for instance caused by driving over rough spots, will not cause an unintended adjustment of the pedal lever 3.

Since the frictional moment M1 depends on the outer radius of the friction portion 30a or on the bearing radius 40, the frictional moment M1 can be varied in the simplest possible way by structurally defining the bearing radius 40. If the frictional moment M1 is to be adequately high, then the bearing radius 40 must be chosen as adequately large.

Since the frictional moment M1 occurs essentially in the region of the portion 30a (FIG. 4) and not in the region of the guide portion 30b, the bearing radius 40 is preferably substantially greater than the outer radius of the guide portion 30b of the bearing journal 30. The guide portion 30b has as small an outer radius as possible, which is typically for bearings.

A spring contact 24c (FIG. 5) is provided on the mounting structure 2, and the spring leg 24a rests on it. The spring contact 24c is embodied such that the spring leg 24a can rest on the spring contact 24c over a relatively long portion of its length. A spring fixation 24e is provided on an end of the spring leg 24a remote from the middle spring region 24m. The task of the spring fixation 24e is to assure that the outer end of the spring leg 24a of the leaf spring 24 cannot shift substantially relative to the mounting structure 2.

A spring contact 24d (FIGS. 5, 6) is provided in the region of the outer end of the spring leg 24b on the pedal lever 3. The spring contact 24d is embodied such that only the end of the spring leg 24b remote from the middle region 24m contacts the pedal lever 3. The prestressed leaf spring 24 assures the restoring force F3 (FIG. 10) at the spring contact 24d.

The leaf spring 24 is preferably built in such a way that the circularly bent middle spring region 24m extends around the pivot axis 22 with approximately constant spacing from it. It is thus attained that the unfixed end of the spring leg 24b (FIG. 5) will not shift, or will shift only insignificantly, relative to the pedal lever 3 upon pivoting of the pedal lever 3.

FIG. 6 shows a modified exemplary embodiment. The sectional plane shown here likewise extends along the dot-dashed line V—V shown in FIG. 3.

In contrast to FIG. 5, in the exemplary embodiment shown in FIG. 6 the end of the spring leg 24b remote from the middle spring region 24m is also fixed against shifting on the pedal lever 3 by a further spring fixation 24f. Since tolerances can never be precluded entirely, in the exemplary embodiment shown in FIG. 6 the spring contacts 24c, 24d are embodied such that only the ends of the leaf spring 24 remote from the middle spring region 24m contact the mounting structure 2 or the pedal lever 3. Upon an actuation of the pedal lever 3, the noncontacting regions of the leaf spring 24, in particular the middle spring region 24m, can thus optionally execute lateral deflection motions. It is thus assured that the function of the accelerator pedal module 1 is unaffected by friction, which can hardly be controlled, between the leaf spring 24 and the pedal lever 3 or the mounting structure 2.

As FIG. 3 shows, the restoring spring assembly 8 includes the two leaf springs 24 and 26 disposed side by side. The leaf springs 24, 26 are spatially separated from one another in the region of the mounting structure 2 by a bridge 46 formed onto the mounting structure 2. In the region of the pedal lever 3, a bridge 48 separates the two leaf springs 24, 26 from one another. The bridge 48 additionally serves to reinforce the pedal lever 3, and the bridge 46 reinforces the mounting structure 2. The leaf spring 26 is formed and deflected in the same way as the leaf spring 24.

The leaf springs 24, 26 can be built in cleverly without requiring any substantial increase in size of the mounting structure 2 or the pedal lever 3. The flexural rigidity of the pedal lever 3 is at most weakened insignificantly by the recessing needed to install the leaf springs 24, 26. To the same material and weight, it is proposed that the region on the mounting structure 2 and on the pedal lever 3 shown shaded as a sectional face in FIGS. 5 and 6 be provided additionally with further recesses or hollow spaces, as shown in FIG. 4. This does not perceptibly reduce the strength but achieves considerable savings in terms of material and weight.

As FIGS. 5 and 6 show, the recesses, in which the leaf spring 24 is placed, in the mounting structure 2 and in the pedal lever 3 are arranged such that if the leaf spring 24 breaks the entire broken leaf spring 24, or part of the leaf spring 24, can fall out at the bottom. Thus any breakage of the leaf springs 2 is easily noticed. The same is true for the second leaf spring 26.

If the leaf spring 24 should break, then in the exemplary embodiment shown at least the spring leg 24b engaging the pedal lever 3 drops out. The spring fixation 24e and/or the spring fixation 24f is embodied such that the spring leg 24a or 24b is unhindered from falling out. The absence of the spring leg 24a and/or the spring leg 24b can easily be seen in an inspection of the motor vehicle. The same is true for the leaf spring 26 as well.

The restoring springs 24, 26 of the restoring spring assembly 8 determine the restoring moment M3 (FIG. 10) for returning the pedal lever 3 to the position of repose R (FIG. 1). If one of the two restoring springs 24, 26 breaks, the restoring moment M3 for returning the pedal lever 3 to the position of repose R is cut in half. As already explained above, the restoring springs 24, 26 also determine the frictional moment M1 or frictional hysteresis that hinders the pivoting motion of the pedal lever 3. If one of the leaf springs 24, 26 fails, the restoring moment M3 is cut in half, and at the same time so is the frictional moment M1 or frictional hysteresis. It is thus assured that even at reduced restoring moment M3, the return of the pedal lever 3 to the position of repose R is assured because the frictional moment M1 is reduced to an equal extent.

Figure 8:
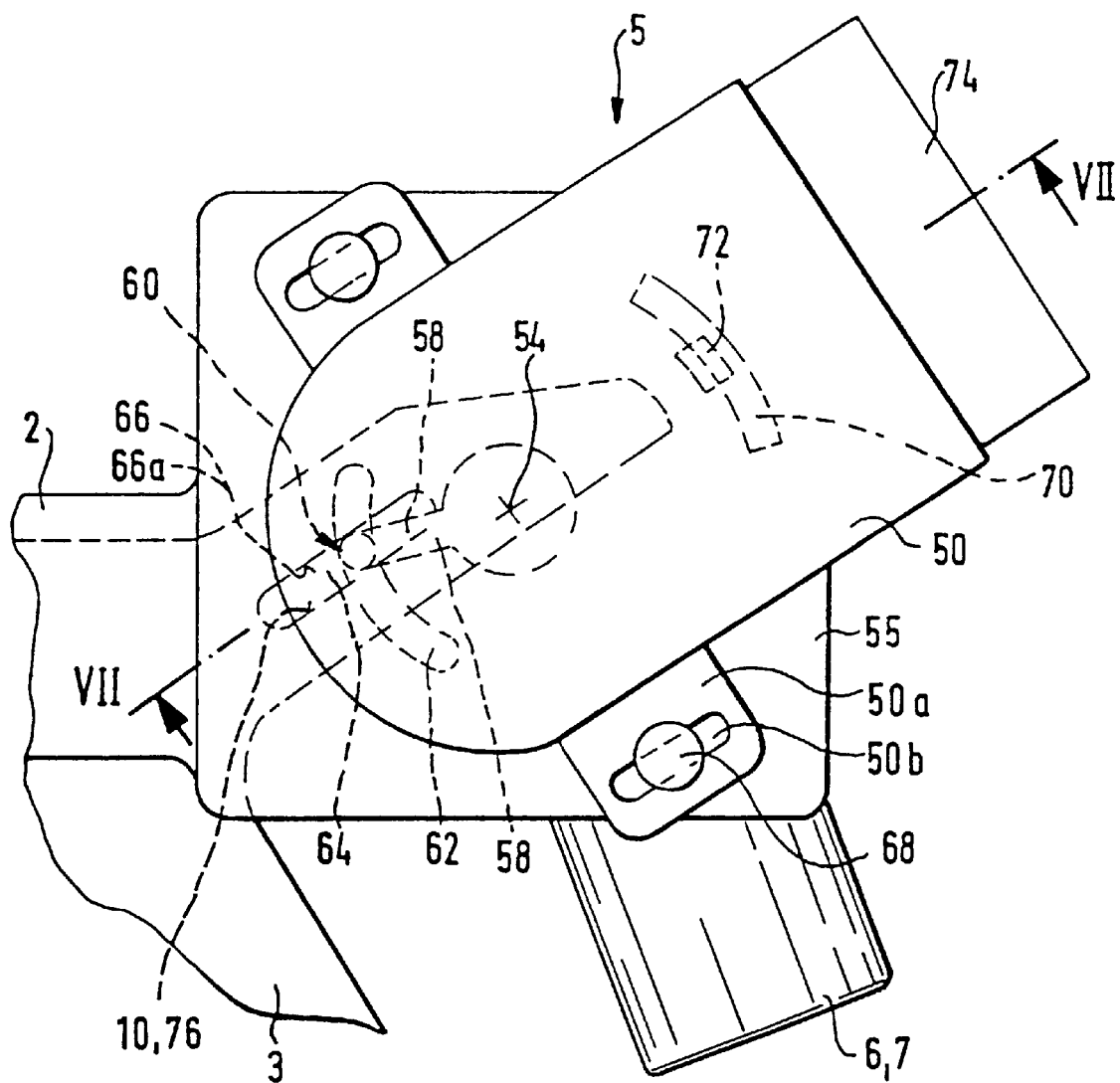
FIG. 8 illustrates a detail of FIG. 2 shown on a different scale.

For the sake of greater simplicity, FIG. 8 shows a detail of FIG. 2 on a different scale, showing the region around the sensor 5.

The sensor 5 is secured to the mounting structure 2 (FIGS. 2 and 8). For the sake of better comprehension, FIG. 7 additionally shows a detail of a cross section along the bent line shown in dot-dashes lines and designated VII—VII in FIGS. 2 and 8.

Figure 7:
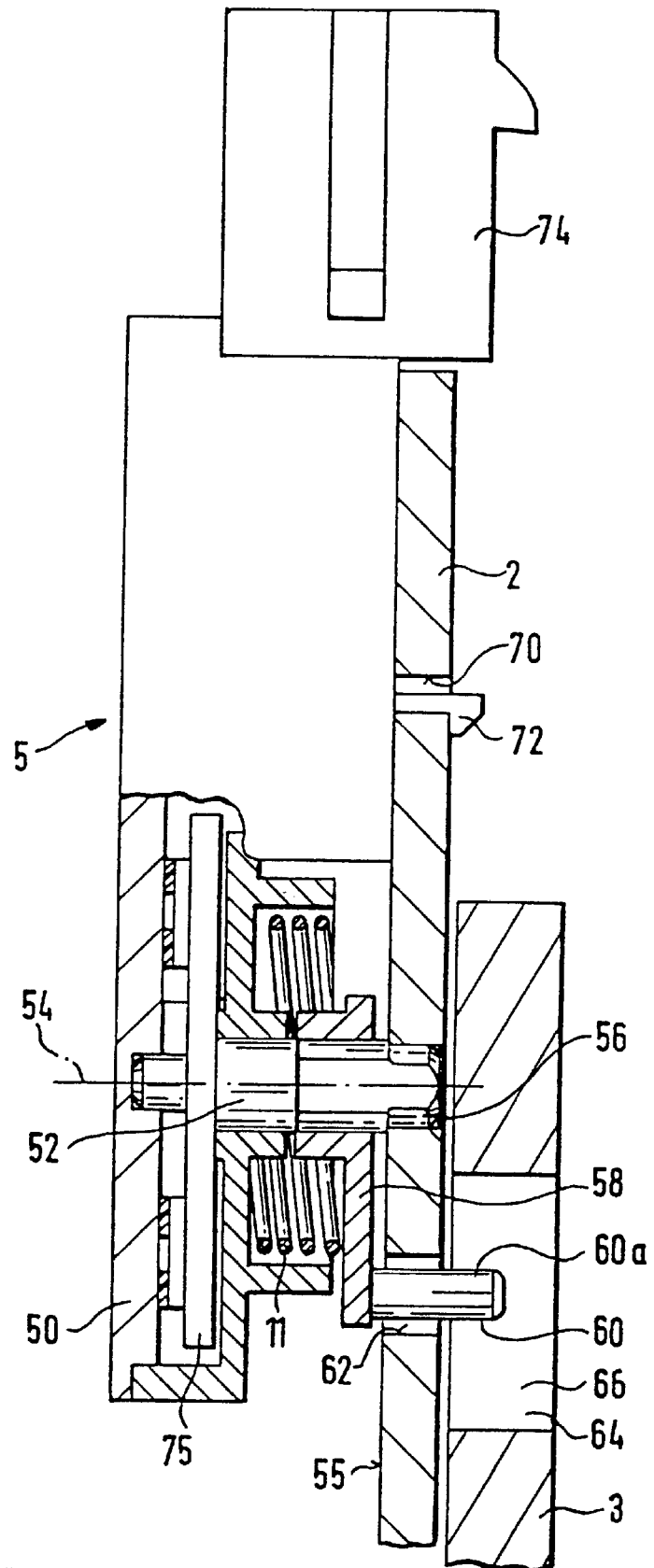
FIG. 7 is a cross-sectional view along lines VII—VII of FIGS. 3 and 8.

The sensor 5 has a sensor housing 50 (FIGS. 7 and 8). A rotatably supported shaft 52 (FIG. 7) protrudes out of the sensor housing 50. The pivot axis of the shaft 52 will hereinafter be called the sensor lever pivot axis 54. The sensor lever pivot axis 54 extends at right angles to the plane of the drawing shown in FIGS. 2 and 8. In FIGS. 2 and 8, the sensor lever pivot axis 54 is represented symbolically by two short intersecting strokes (+) and in FIG. 7 with a dot-dash line.

A sensor retaining face 55 is formed onto the mounting structure 2. The sensor 5 is secured to the sensor retaining face 55. A bore acting as a sensor guide 56 is provided in the sensor retaining face 55. In this sensor guide 56, the shaft 52 that protrudes out of the sensor housing 50 is rotatably supported with little play. A sensor lever 58 is connected to the shaft 52 in a manner secured against relative rotation. A sensor lever pivot connection 60 is provided on the sensor lever 58, radially spaced apart from the sensor lever pivot axis 54. In the exemplary embodiment shown, the sensor lever pivot connection 60 is formed by a pin 60a secured to the sensor lever 58 parallel to the sensor lever pivot axis 54. An oblong slot 62 is provided in the mounting structure 2, or more specifically in the sensor retaining face 55. The oblong slot 62 is dimensioned such that the sensor lever 58 can execute the requisite pivoting motions without hindrance.

An oblong slot 64 is provided (FIGS. 5, 6) in the pedal lever 3. One long side of the oblong slot 64 serves as a stop 66a and forms a pedal lever pivot connection 66. The pedal lever pivot connection 66 and the sensor lever pivot connection 60 are embodied such that the pedal lever 3 can adjust the sensor lever 58 counter to the sensor restoring spring 11 (FIGS. 1, 7).

The sensor restoring spring 11 acts on one end upon the sensor housing 50 and on the other upon the sensor lever 58 (FIG. 7). Looking in the direction shown in FIG. 8, the sensor restoring spring 11 acts clockwise upon the sensor lever 58. The sensor restoring spring 11 assures that the pin 60a of the sensor lever pivot connection 60 is in constant play-free engagement with the stop 66a of the pedal lever pivot connection 66 (FIG. 8).

A pivoting motion of the pedal lever 3 means a pivoting motion of the pedal lever pivot connection 66 about the pivot axis 22, which in turn leads to a pivoting motion of the sensor lever pivot connection 60 about the sensor lever pivot axis 54. By the choice of the spacing between the pedal lever pivot connection 66 and the pivot axis 22 (FIG. 2), or the spacing between the sensor lever pivot connection 60 and the sensor lever pivot axis 54, the step-up with which a rotary motion of the pedal lever 3 is to be converted into a rotary motion of the shaft 52 can be fixed structurally in a simple way and adapted to a specific vehicle.

Since high demands must be made of the sensor 5, it is a complex component, which can be manufactured at low per-piece production cost only if large numbers per production batch are produced; any variant embodiment drives the per-piece production costs perceptibly upward. In the accelerator pedal module 1 presented here, there is the advantage that the sensor 5 can be used unchanged, despite the most various vehicle-specific demands. By a suitable choice of the spacing between the pivot axis 22 and the stop 60a of the pedal lever pivot connection 66, the step-up between the pedal lever 3 and the sensor 5 can be adapted in a simple way to the particular need. In other words, the pedal lever 3 can be embodied such that even given the most various vehicle-specific pedal travel distances, the intended maximum measurement distance of the sensor 5 can always be utilized, without having to adapt the sensor 5 in a special way for the purpose. Since it is hardly avoidable, for the most various reasons (such as visual appearance, variable foot room in the interior of the vehicle, ergonomics, etc.) that the pedal lever 3 be adapted to the particular vehicle type, an adaptation of the stepup between the pivot angle of the pedal lever 3 and the pivot angle of the sensor lever 58 by suitably adapting the spacing between the pedal lever pivot connection 66 and the pivot axis 22 involves no additional expense whatever. Since normally one special form must be made for the pedal lever 3 for each type of vehicle, it is possible without additional expense to adapt the spacing between the pivot axis 22 and the pedal lever pivot connection 66 to suit the requisite stepup.

The actuation angle alpha ($\alpha$) of the pedal lever 3, at approximately 12° to 20°, is normally relatively small. It is therefore proposed that the spacing between the pivot axis 22 and the pedal lever pivot connection 66 be selected as great enough that the full pivot angle of the sensor lever 58 can be utilized to the full. The pivot angle of the sensor lever 58 should be as great as possible, for the sake of good resolution. In the accelerator pedal module 1 proposed, it is possible by suitable dimensioning of the spacing between the pivot axis 22 and the pedal lever pivot connection 66 to achieve any desired stepup without effort or expense.

Two flanges 50a (FIG. 8) are formed laterally onto the sensor housing 50. Oblong slots 50b are provided in the flanges 50a. For mounting the sensor 5 on the mounting structure 2, the sensor retaining face 55 is embodied in platelike fashion. In the region of the sensor retaining face 55, two pins 68 are formed onto the mounting structure 2 in such a way that when the sensor 5 is placed against the sensor retaining face 55 and the shaft 52 is simultaneously introduced into the sensor guide 56 (FIG. 7), the pins 68 enter the oblong slots 50b. The pins 68 protrude past the flanges 50a on the side remote from the sensor retaining face 55. The oblong slots 50b are dimensioned in such a way that the sensor 5 upon mounting, or for adjusting the zero point of the sensor 5, can be pivoted somewhat about the pivot point defined by the sensor guide 56 (FIG. 7). After this setting and adjustment of the sensor 5, the pins 68 that protrude past the flanges 50a are heated and pressed on the side protruding past the flanges 50a. As a result, the protruding portion of the pins 68 expands, and the sensor 5 is fixed in this way to the mounting structure 2. This prevents an unintended shifting of the sensor 5. FIG. 8 shows the pins 68 once the fixation of the sensor 5 has been accomplished.

To facilitate mounting the sensor 5 to the mounting structure 2, and as an additional retention provision, an oblong slot 70 is provided in the mounting structure 2 and a hook 72 is provided on the sensor housing 50 (FIGS. 7, 8). The oblong slot 70 extends concentrically around the sensor guide 56. When the sensor 5 is put in place or when the shaft 52 is introduced into the sensor guide 56, the hook 72 extends through the oblong slot 70 and hooks onto the mounting structure 2. As a result, the sensor 5 is already held firmly on the mounting structure 2 even before the aforementioned fixation of the sensor 5 is accomplished with the aid of the heatable pins 68. In addition, the hook 72 provides one additional securing point for attaching the sensor 5 to the mounting structure 2.

A plug 74 is integrated into or onto the sensor 5. The housing of the plug 74 is molded jointly with the sensor housing 50 as a plastic part. The plug 74 serves as a plug connection of a cable for delivering the sensor signals to be furnished by the sensor 5 to the controller 15 (FIG. 1).

The sensor 5 is of the potentiometer type, for instance. A wiper lever 75 is connected to the shaft 52 in a manner fixed against relative rotation and is thus connected in a manner fixed against relative rotation to the sensor lever pivot connection 60 (FIG. 7). There are wipers on the wiper lever 75, which upon a pivoting motion of the sensor lever 58 sweep over resistor paths that are mounted in the sensor housing 50. This changes an electrical signal, which can be supplied to the controller 14 (FIG. 1) via the plug 74 (FIG. 7). It is possible to choose a contactless sensor, instead of the sensor 5 functioning like a potentiometer.

The oblong slot 64 of the pedal lever 3 has two long sides. One of the two long sides forms the aforementioned stop 66a of the pedal lever pivot connection 66. The other long side serves as a counter stop 76 (FIG. 6). The counter stop 76 together with the pin 60a of the sensor lever pivot connection 60 forms the restoring safety means 10 already emphasized in the description of FIG. 1. In the normal situation, the pin 60a of the sensor lever pivot connection 60 rests continuously and without play on the stop 66a of the pedal lever pivot connection 66.

If the sensor restoring spring 11 should fail in the event of a defect, for instance because the sensor restoring spring 11 breaks (FIGS. 1 and 7), then the counter stop 76 of the restoring safety means 10 assures that when the pedal plate 28 (FIG. 2) is released, or in other words when the pedal lever 3 is shifted to the position of repose R (FIG. 1), the sensor lever 58 is likewise slaved in the restoring direction. Because the restoring spring assembly 8 is embodied in the form of two leaf springs 24, 26, it is assured that even if one of the two leaf springs 24, 26 fails, the pedal lever 3 will reach its position of repose R. Moreover, the restoring safety means 10 acting between the pedal lever 3 and the sensor lever 58 assures that the sensor 5 will be actuated in the restoring direction under all circumstances when the pedal plate 28 is released.

In the normal operating state, there is slight play between the pin 60a and the counter stop 76, so that the pin 60a can move inside the oblong slot 64 without the danger of seizing or high friction. The play between the pin 60a and the counter stop 76 of the restoring safety means 10 is not overcome unless the sensor restoring spring 11 fails, but since it is relatively slight, in the event of a defect of the sensor restoring spring 11, this elimination of the play has no significant negative effect.

A receiving opening 80 (FIGS. 5, 6) is provided in or on the mounting structure 2. A housing 82 is secured in the receiving opening 80. The housing 82 serves to receive the kickdown mechanism 7. The housing 82 has one thinner region 82a, one thicker region 82b, and resilient claws 82c. A pin 82d is axially displaceably supported in the housing 82. The diameters are adapted in such a way that the thinner region 82a fits into the receiving opening 80 far enough that the thicker region 82b come to rest on the mounting structure 2. The resilient claws 82c hook onto the mounting structure 2 and thus assure that the housing 82 cannot fall out of the receiving opening 80. The kickdown mechanism 7 can be attached very easily to the accelerator pedal module 1 by inserting the housing 82 into the receiving opening 80. If the housing 82 should prove not to be inserted all the way into the receiving opening 80 during assembly, then at the latest the first time the pedal lever 3 is actuated forcefully, the housing 82 will be inserted all the way into the receiving opening 80. This provides a high degree of safety despite a considerably simplified assembly.

Upon actuation of the pedal lever 3, the pedal lever 3 pivots clockwise (FIGS. 5, 6). At a certain angular position, a stop 84 provided on the pedal lever 3 comes to rest on the pin 82d. The kickdown mechanism 7 is embodied such that once the stop 84 contacts the pin 82d, then if the pedal lever 3 is actuated further the pin 82d is pressed into the housing 82. As the pin 82d is pushed into the housing 82, the restoring force rises abruptly at a certain point. As a result, at a certain angular position of the pedal lever 3, the additionally required pedal force resulting from the kickdown mechanism 7 increases abruptly. The kickdown mechanism 7 may be embodied such that upon actuation of the pedal lever 3 in the opposite direction, that is, counterclockwise, the restoring force drops abruptly at a certain angular position. Instead of the kickdown mechanism 7, some other functional element may also be inserted into the receiving opening 80. If the kickdown mechanism 7 is not needed, then a fixed stop 86 can for instance be inserted into the receiving opening 80. The fixed stop 86 has approximately the same shape externally, for instance, as the housing 82. If there is a fixed stop 86, then the pin 82d protruding in the direction of the stop 84 is provided, solidly fixed, instead of the displaceable pin 82d of the kickdown mechanism 7.

Instead of the kickdown mechanism 7 or instead of the fixed stop 86, the switch 6 already mentioned in conjunction with FIG. 1 may be built into the receiving opening 80. The switch 6 has the same external dimensions, for instance, as the housing 82 described in conjunction with the kickdown mechanism 7.

The housing 82 may be designed on its inside such that the kickdown mechanism 7 and the switch 6 are located in it.

The resilient claws 82c form a snap mechanism or snap fixation that is easy to produce, for easy selective mounting of the kickdown mechanism 7 or switch 6 or fixed stop 86. The accelerator pedal module 1 can be adapted to the particular vehicle-specific demands simply by exchanging the kickdown mechanism 7, the fixed stop 86, and the switch 6 for one another as applicable. For instance, in a vehicle with an automatic transmission, the kickdown mechanism 7 is needed more often, while in vehicles with a manual transmission the fixed stop 86 is more likely normally needed. Because of the possibility of various inserts in the receiving opening 80 of the mounting structure 2, the number of different variants to be manufactured is reduced, which markedly lowers production costs.

A friction lining 35 (FIG. 4) may be mounted on the inside radius of the bearing shell 34. To connect the friction lining 35 intimately with the bearing shell 34, recesses are provided in the bearing shell 34. The friction lining 35 is cast onto the bearing shell 34 and because of the recesses meshes firmly with the bearing shell 34. The friction lining 35 is contemplated so that favorable values for the wear and friction can be attained, and so that a favorable material from the standpoint of strength can be chosen for the bearing shell 34. Instead of being applied to the bearing shell 34, or in addition thereto, a friction lining may also be applied to the outer circumference of the friction portion 30a of the bearing journal 30. One skilled in the art can achieve this variant as an alternative without requiring illustration of it in the drawing.

The material of the friction lining 35 is preferably selected with a view to low wear, and also with a view to having the friction as high as possible at the onset of motion and during the motion.

In the exemplary embodiments selected for the drawing and for the detailed description of the invention, the bearing shell 34 is connected to the mounting structure 2, and the bearing journal 30 is associated with the pedal lever 3. It should be noted that the exemplary embodiment shown may also be modified such that the bearing shell 34 is secured to the pedal lever 3, and the bearing journal 30 can correspondingly be formed onto the mounting structure 2. This reversal in the disposition of the bearing shell 34 and the bearing journal 30 can be executed as an equivalent by one skilled in the art without requiring additional illustration in the drawing for the purpose. If two bearing journals and two bearing shells are used, then one of the two bearing shells can be associated with the mounting structure 2, while the other bearing shell is associated with the pedal lever 3. The same is true for the bearing journals.

In the exemplary embodiments shown, the receiving opening 80 is provided for receiving the kickdown mechanism 7 or the fixed stop 86 on the mounting structure 2. The stop 84, which enters into engagement with the kickdown mechanism 7 or the fixed stop 86, is also located on the pedal lever 3. It should be noted that this disposition can be reversed. That is, the receiving opening 80 may be provided on the pedal lever 3. In that case, the kickdown mechanism 7 or the fixed stop 86 is located on the pedal lever 3 and is pivoted together with the pedal lever 3. The kickdown mechanism 7 disposed on the pedal lever 3, or the fixed stop 86, comes to rest on a stop provided on the mounting structure 2 upon corresponding pivoting of the pedal lever 3. This reversal of the disposition of the kickdown mechanism 7 or the fixed stop 86 can be achieved as an equivalent by one skilled in the art with requiring an illustration of this modification in the drawing.

In the exemplary embodiments shown, the sensor lever pivot connection 60 includes the pin 60a, and the pedal lever pivot connection 66 includes the stop 66a. The stop 66a extends essentially radially to the pivot axis 22. The accelerator pedal module 1 may also be modified in such a way that the stop is located on the sensor lever 58 and is associated with the sensor lever pivot connection 60. Correspondingly, the pin is located on the pedal lever 3 and is associated with the pedal lever pivot connection 66. This modified embodiment can be performed by one skilled in the art as an equivalent without support from a drawing.

Figure 9:
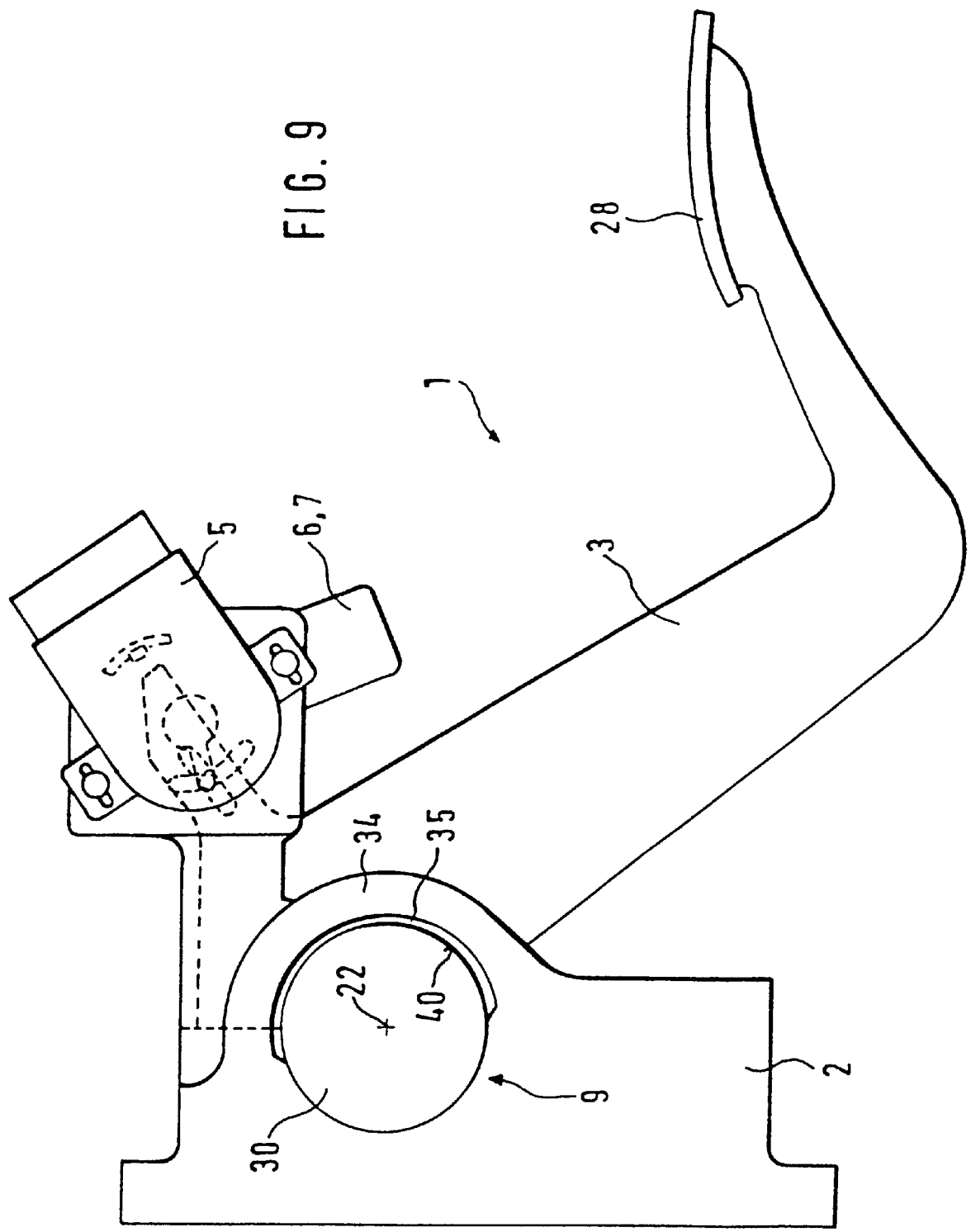
FIG. 9 illustrates a modification of the structure shown in FIG. 2.

FIG. 9 shows a further selected, especially advantageous, simple exemplary embodiment.

In the exemplary embodiment shown in FIG. 9, the bore with the bearing radius 40 for receiving the bearing journal 30 connected to the bearing journal 3 is located directly in the mounting structure 2. In this exemplary embodiment, the bearing shell 34 is not mounted on the mounting structure 2 as shown in FIG. 2 but rather is formed integrally with it. The bearing shell 34 is fully integrated as a component with the mounting structure 2 and can be made together with the remainder of the mounting structure 2 in the form of a plastic part made in a single cohesive injection mold.

In the exemplary embodiment shown in FIG. 9, the pedal lever 3 can be mounted on the mounting structure 2 for instance by means of laterally bending a side wall that carries the bearing shell 34 elastically away; the opening for receiving the bearing journal 30 is located in this side wall and thus the bearing journal 30 can snap into that opening.

As already mentioned, the restoring force F3 of the restoring spring assembly 8 in the region of the bearing point 9 causes a reaction force F4 upon the pedal lever 3. The reaction force F4 produces a counterforce in the opposite direction on the bearing shell 34. The primary direction of the counterforce on the mounting structure 2 is substantially toward the right in terms of FIGS. 2 and 9. It is therefore sufficient in principle if the friction lining 35 is applied only to the right-hand region (in terms of the drawing) of the mounting structure 2 and/or the bearing journal 30, as shown in FIGS. 4 and 9.

In the exemplary embodiment shown in FIGS. 2 and 4, the bearing journal 30 has a larger diameter in the region of the friction portion 30a that in the region of the guide portion 30b. The friction portion 30a and the guide portion 30b each extend over an angle of approximately 180°. It should be pointed out that the accelerator pedal module 1 can also be modified, as needed, in such a way that the bearing journal 30 has the diameter over the entire circumference as shown in FIG. 9.

The foregoing relates to preferred exemplary embodiments of the invention, it being understood that other variants and embodiments thereof are possible within the spirit and scope of the invention, the latter being defined by the appended claims.

We claim:

1. An accelerator pedal module for controlling the output of a driving engine of a vehicle, comprising a mounting structure, a pedal lever (3) supported via a bearing point on said mounting structure (2) and pivotally about a pivot axis via a pivot angle, a sensor (5) that detects the position of the pedal lever (3) and furnishes an electrical signal accordingly to a controller, a restoring spring assembly (8) for restoring the pedal lever (3) to a position of repose (R), the sensor (5) has a sensor housing (50) that is fixed relative to the mounting structure (2) and a sensor lever (58) pivotally supported in the sensor housing (50) about a sensor lever pivot axis (54), the pivoted position of the sensor lever determining the electrical signal, a sensor lever pivot connection (60) spaced radially apart from the sensor lever pivot axis (54) is provided on the sensor lever (58), and a pedal lever pivot connection (66) in engagement with the sensor lever pivot connection (60) is provided on the pedal lever (3), spaced radially apart from the pivot axis (22).

2. An accelerator pedal module in accordance with claim 1, in which the sensor housing (50) is pivotable about the sensor lever pivot axis (54) in order to adjust the electrical signal.

3. An accelerator pedal module in accordance with claim 1, in which the pedal lever pivot connection (66) on the pedal lever (3) includes a stop (66a) that extends substantially radially to the pivot axis (22), the stop carrying the sensor lever pivot connection (60) along with it upon an actuation of the pedal lever (3).

4. An accelerator pedal module in accordance with claim 1, in which the sensor lever pivot connection (60) on the sensor lever (58) includes a stop that extends substantially radially to the sensor lever pivot axis (54) and is slaved by the pedal lever pivot connection (66) upon an actuation of the pedal lever (3).

5. An accelerator pedal module in accordance with claim 1, in which the sensor (5) is designed as a premountable structural unit.

6. An accelerator pedal module in accordance with claim 1, in which at a bearing point (9), at least one bearing shell (34, 36) with a bearing radius (40) and at least one bearing journal (30, 32) supported in the bearing shell (34, 36) and adapted to the bearing radius (40) are provided, and the bearing radius (40) is dimensioned as large enough that a significantly perceptible frictional hysteresis that hinders a pivoting motion of the pedal lever (3) is created.

7. An accelerator pedal module in accordance with claim 6, in which the restoring spring assembly (8) engages the pedal lever (3) in such a way that as a result of the restoring spring assembly (8) not only a restoring moment (M3) for restoring the pedal lever (3) to the position of repose (R) but also a reaction force (F4) is created between the bearing shell (34) and the bearing journal (30).

8. An accelerator pedal module for controlling the output of a driving engine of a vehicle, comprising a pedal lever (3) supported via a bearing point on a mounting structure (2) and pivotally about a pivot axis via a pivot angle, a controlling sensor (5) that detects a position of the pedal lever (3) and furnishes an electrical output signal accordingly to said controller, a restoring spring assembly (8) for restoring the pedal lever (3) to a position of repose (R), the sensor (5) has a sensor housing that is fixed relative to the mounting structure (2) and a sensor operating means supported in the sensor housing, the position of the sensor operating means is caused by said pedal lever and determines said electrical output signal, which is transmitted to said controller.

9. An accelerator pedal module in accordance with claim 8, in which a restoring safety means (10) that restores the sensor operating means to a safety position is provided between the pedal lever (3) and the sensor.

10. An accelerator pedal module in accordance with claim 9, in which a counter stop that extends substantially radially to the axis (22) and slaves the sensor is provided on the pedal lever (3).

11. An accelerator pedal module in accordance with claim 9, in which a counter stop (76) that extends substantially radially to the sensor lever pivot axis (54) and is slaved by the pedal lever pivot connection (66) is provided on the sensor lever (58).

12. An accelerator pedal module in accordance with claim 8, in which the sensor (5) has a sensor restoring spring (11) that restores the sensor operating means.

13. An accelerator pedal module in accordance with claim 8, in which the sensor (5) is secured to the mounting structure (2).

14. An accelerator pedal module in accordance with claim 8, in which the restoring spring assembly (8) has at least one restoring spring (24, 26) acting on one end on the pedal lever (3) and on the other end on the mounting structure (2).

15. An accelerator pedal module in accordance with claim 14, in which the restoring spring assembly (8) includes at least two restoring springs (24, 26).

16. An accelerator pedal module in accordance with claim 15, in which if the restoring spring (24, 26) breaks, at least a fragment of the restoring spring (24, 26) falls visibly out of its functional position.

17. An accelerator pedal module in accordance with claim 14, in which the at least one restoring spring (24, 26) is a leaf spring (24, 26).

18. An accelerator pedal module in accordance with claim 17, in which the leaf spring (24, 26) is bent approximately in a U and has two spring legs (24a, 24b) joined via an arc (24m), one of the spring legs (24a) acting upon the mounting structure (2) and the other spring leg (24b) acting upon the pedal lever (3).

19. An accelerator pedal module in accordance with claim 16, in which at least a portion of the leaf spring (24) is integrated with the pedal lever (3) and/or with the mounting structure (2).

20. An accelerator pedal module in accordance with claim 8, in which a kickdown mechanism (7) is provided that in a definable position of the pedal lever (3) exerts an abrupt increase in force on the pedal lever (3).

21. A accelerator pedal module in accordance with claim 20, in which the kickdown mechanism (7) is secured to the mounting structure (2) via a snap mechanism (82c).

* * * * *